Figure 1:
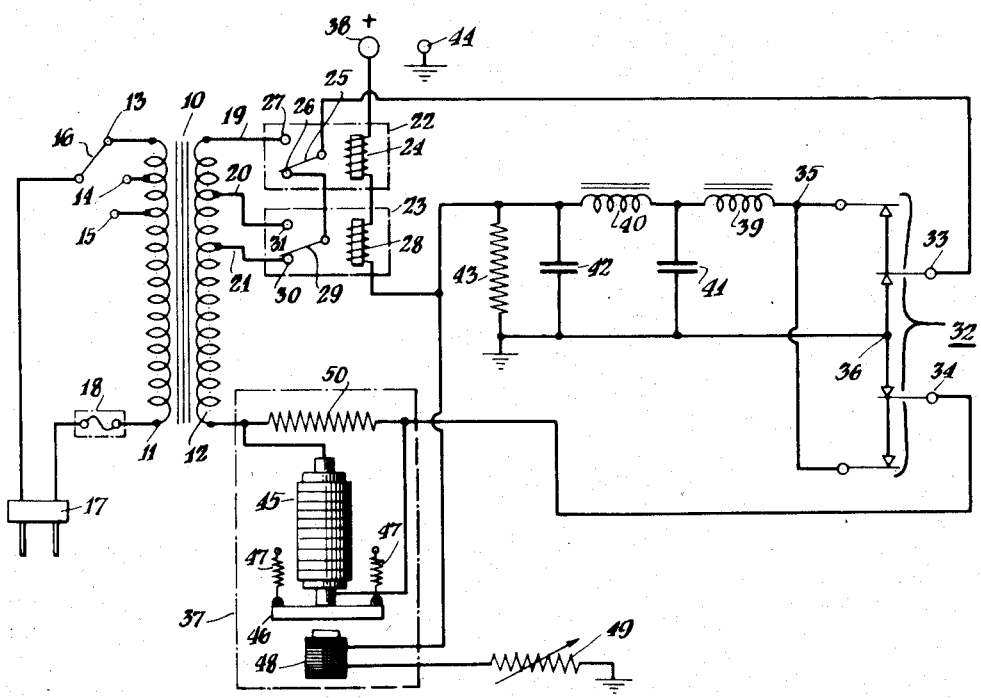

Nov. 4, 1947.   R. O. WHITESELL   2,430,381
CONSTANT VOLTAGE RECTIFIER POWER SUPPLY
Filed Aug. 18, 1944

INVENTOR.
Robert O. Whitesell
BY Chester F. Carlson
ATTORNEY

Patented Nov. 4, 1947

2,430,381

UNITED STATES PATENT OFFICE 2,430,381

CONSTANT VOLTAGE RECTIFIER POWER SUPPLY

Robert O. Whitesell, Indianapolis, Ind., assignor to P. R. Mallory & Co., Inc., Indianapolis, Ind., a corporation of Delaware Application August 18, 1944, Serial No. 549,992

8 Claims. (Cl. 175—363)

1

The present invention relates to rectifier power supply systems, and, more particularly, to a constant voltage rectifier power supply of novel and improved character.

As those skilled in the art know, dry disc rectifiers in combination with suitable filter circuits are at present used on a substantial scale to supply direct current from an alternating current power line. Although power supply systems of this type are simple in construction and reliable in operation, they have the disadvantage of providing very poor regulation in the rectifier, in the filter circuit, and in the power line itself. It has been already suggested to provide automatic voltage regulators of the carbon pile type in power supply systems of the described character and thereby to adjust the input voltage to the rectifier so as to maintain the rectified output voltage constant regardless of variations in load. This otherwise sound operating principle was greatly restricted in its practical applications due to the limited capacity of the commercially available voltage regulators. In general, commercial voltage regulators were incapable of dissipating more than 50 to 75 watts in normal operation and were hardly able to dissipate more than about 100 watts even when they were cooled by an air blast. Other suggestions involved the use of switching devices responsive to changes in the output circuit to properly adjust the input to the rectifier. This remedy was relatively ineffective as the adjustment was only in a few large steps within which the usual poor regulation persisted. Further proposals were based on the application of saturated reactors and transformers and had the disadvantage of requiring heavy and bulky equipment which also was quite expensive. Although also many other suggestions and proposals were made to eliminate the foregoing difficulties and disadvantages connected with the construction and operation of conventional rectifier power supply systems, none, as far as is known, of these suggestions and proposals was completely satisfactory and successful when carried into practice on a practical and commercial scale.

It is an object of the present invention to provide a full and completely satisfactory solution of the outstanding problem.

It is another object of the present invention to provide a constant voltage rectifier power supply system which greatly increases the power handling ability of conventional voltage regulators.

It is a further object of the invention to provide a constant voltage rectifier power supply system of novel and improved character which is capable of handling substantial power and of

2 providing continuous and automatic voltage control over the full range of its practical operation.

It is also within the contemplation of the present invention to combine a carbon pile voltage regulator with a plurality of current-responsive relays in a regulated constant voltage rectifier power supply system of greatly increased capacity.

The invention also contemplates a constant voltage rectifier power supply system which is simple in construction, reliable in operation, and which may be readily manufactured on a practical and commercial scale at a low cost.

Figure 2:
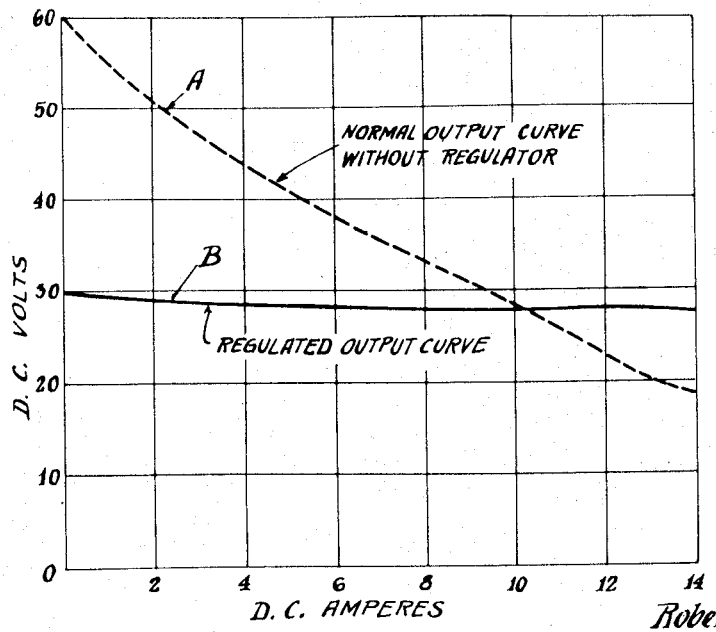

Other and further objects and advantages of the invention will become apparent from the following description, taken in conjunction with the accompanying drawing; in which Fig. 1 illustrates a preferred form of circuit organization of a rectifier power supply system embodying the principles of the present invention; and Fig. 2 is a graph depicting a typical operating curve of a power supply system embodying the invention.

While a preferred embodiment of the invention is described herein, it is contemplated that considerable variation may be made in the method of procedure and the construction of parts without departing from the spirit of the invention. In the following description, and in the claims, parts will be identified by specific names, for convenience, but they are intended to be as generic in their application to similar parts as the art will permit.

Referring now more particularly to Fig. 1 of the drawing, reference character 10 denotes a power transformer having a primary winding 11 and a secondary winding 12. The primary winding of the said transformer is provided with a plurality of taps 13, 14 and 15 to which selective connection may be made by means of a switching member or contact arm 16. The primary circuit may be energized from the alternating current power line by means of a conventional connector plug 17, there being a fuse 18 interposed in the circuit to protect the system from short circuits and overload. Taps 13, 14 and 15 on the primary winding are provided for the purpose of adjusting the primary circuit to high, normal and low line voltages.

The secondary or low voltage winding 12 of the transformer is likewise provided with a plurality of taps, respectively denoted by 19, 20, and 21. These taps are under the control of a pair of current-responsive limit relays generally denoted by reference characters 22 and 23. Of these relays 22 comprises operating coil 24, adapted when energized by a current of determined intensity to actuate switching arm 25, and to transfer the same from rest contact 26 to working contact 27. Limit relay 23 is of identical construction except that it is designed and adjusted for operation at a lower current than relay 22. It comprises an operating coil 28, switching arm 29, rest contact 30 and working contact 31. Tap 19 of the secondary winding of the transformer is connected to contact 27 of relay 22, and taps 20 and 21 are respectively connected to contacts 31 and 30 of relay 23.

Rectification is accomplished by means of a dry disc bridge rectifier 32, having input terminals 33, 34 for the alternating voltage to be rectified and positive and negative output terminals 35 and 36 respectively for the rectified direct current. Input terminal 33 of the rectifier is connected to switching arm 25 of relay 22, while input terminal 34 of the rectifier is connected to the lower end of secondary winding 12 through the controlled circuit of carbon pile voltage regulator 37.

The positive output terminal 35 of the rectifier is connected to the positive output terminal 38 of the power supply through filter chokes 39 and 40 and through the serially connected operating coils 28 and 24 of the two relays. Filter condensers 41 and 42 are connected between the ends of chokes 39 and 40, respectively, and ground, and a buffer resistor 43 is connected across condenser 42. Reference character 44 denotes the negative output terminal of the power supply which is directly connected to ground and thus to terminal 36 of the rectifier.

The carbon pile voltage regulator 37 essentially comprises a carbon pile 45, interposed in the circuit to be controlled, which is under compression by an armature 46, biased by strong springs 47. This compression is more or less offset by the magnetic attraction of the armature when solenoid 48 is energized. Solenoid 48 is connected across the filtered output of the rectifier, one of its ends being connected to the "hot" side of said output, and its other end being connected to ground through a variable resistance 49, which serves to adjust the range of operation of the regulator. A diverter resistor 50 of appropriate value is connected across carbon pile 45 to by-pass a portion of the controlled current and thereby to increase the current handling ability of the regulator.

From the foregoing description the operation of the constant voltage rectifier power supply system of the invention will be readily understood by those skilled in the art. Broadly stated, voltage regulator 37 is responsive to changes in the rectified and filtered voltage. The higher this voltage, the greater will be the current flowing through solenoid 48, which offsetting in part the biasing force of springs 47, will increase the resistance of carbon pile 45 and thereby will reduce the input of alternating voltage applied to the rectifier 32. On the other hand, operating coils 22, 28 of the relays being connected in series with the output, will be responsive to changes of the load current and will change taps on the secondary winding of transformer 10, as it will be set forth more fully hereinafter.

When the load circuit connected between terminals 38 and 44 is either open or the load current is small, such as, for example, less than 2 amperes, both relays 22 and 23 will be inoperative and their switching arms 25 and 29 will close their respective rest contacts 26 and 30. The lowest voltage tap 21 of the transformer will be effective, such voltage being applied through contact 30 and contact arm 29 of relay 23, and through contact 26 and contact arm 25 of relay 22 to terminal 33 of the rectifier, and through terminal 34 of the rectifier and carbon pile 45 and diverter resistance 50 back to the lower end of the secondary winding. Voltage regulator 37 will be effective in compensating for changes in the load current within this narrow range and also for small line voltage changes.

When the load current increases to 2 amperes, limit relay 23 becomes operative and its switching arm 29 will make with contact 31 connected to the intermediate voltage tap 20 of the secondary winding, thereby applying a higher alternating current input voltage to rectifier 32. Finally, when the load current further increases to about 5 amperes, limit relay 22 will be likewise energized and will displace its switching arm 25 from its rest contact 26 to its working contact 27 so that highest voltage tap 19 of the secondary winding will be connected to the rectifier, while the lower voltage taps of the transformer secondary will be disconnected at contact 26 of relay 22. At all times, voltage regulator 37 compensates for voltage changes between the above current values and also for small line voltage changes. While relays 22 and 23, when switching over from one tap of the secondary winding of the transformer to another, will momentarily break the alternating current input circuit, filter condensers 41, 42 store enough energy to keep the load current flowing during these short intervals when no energy is supplied to the rectifier.

Fig. 2 is a graph showing a typical voltage regulation curve obtained with the constant voltage rectifier power supply system of the invention, compared with the regulation curve obtained without the principles of the invention. It will be noted from curve A, obtained without the regulator, that when the load current is increased from zero to 14 amperes, the output voltage will drop from 60 volts to 19 volts, indicating extremely poor regulation. Curve B, on the other hand, indicates the excellent voltage regulating characteristics of the power supply system of the invention, as the voltage drop between zero to maximum load is merely from 30 to 28 volts, that is 2 volts. Curve B has been obtained with a power supply embodying the invention rated at 28 volts, 10 amperes.

It will be noted that the principles of the invention provide a number of important advantages. Thus, first of all, the invention provides a possibility for greatly extending the range of operation and the output current capacity which may be obtained with the commercially available voltage regulators. Thus, with present standard regulators, it is possible to obtain output voltages up to about 50 volts and output currents up to about 15 amperes. Of course, this output, corresponding to about 750 watts, is several times greater than that obtainable with conventional voltage regulators, unaided by the principles of the present invention.

It is also to be observed that while the current-handling capacity of commercial voltage regulators is actually multiplied by application of the invention, smooth and continuous voltage control is retained regardless of the greatly increased capacity. Of course, this continuous and positive voltage control would not be obtained by any one of the conventional devices employing step-by-step control of the voltage.

Moreover, the power supply system of the invention is very simple in construction, light in weight, and is positive and reliable in operation. For these reasons, it is excellently adaptable for aircraft applications to operate a large percentage of the direct current electrcal equipment requiring 12 or 24 volts.

While the present invention, as to its objects and advantages, has been described herein as carried out in specific embodiments thereof, it is not desired to be limited thereby but it is intended to cover the invention broadly within the spirit and scope of the appended claims.

What is claimed is:

1. A rectifier power supply system which comprises in combination a rectifier, an alternating current input circuit for said rectifier, a direct current output circuit electrically associated with said rectifier, means responsive to the rectified output current to step-by-step adjust the input voltage to the rectifier, and means responsive to the rectified output voltage to continuously adjust the input voltage to the rectifier within the range defined by each step thereby to maintain the output voltage substantially independent from the output current.

2. A constant voltage rectifier power supply system which comprises in combination a rectifier, an alternating current input circuit for said rectifier, a direct current output circuit electrically associated with said rectifier, means responsive to the current in said output circuit to apply input voltages selected from a plurality of substantially fixed values to said rectifier, and means responsive to the voltage in said output circuit to continuously adjust the input voltage to the rectifier within the range of two of said fixed values thereby to maintain the output voltage constant and independent from variations in the load.

3. A constant voltage rectifier power supply system which comprises in combination a rectifier, a tapped impedance device adapted to apply alternating voltages of different value to said rectifier, a direct current output circuit for said rectifier, means responsive to the current in said output circuit to selectively connect taps on said impedance device to the rectifier, and means responsive to the voltage in said output circuit to continuously adjust the voltage applied to the rectifier between any two subsequent tapped values thereby to maintain the output voltage independent from load variations.

4. A constant voltage rectifier power supply system which comprises in combination a dry-disc rectifier, a transformer having a tapped secondary winding adapted to apply alternating voltages of different value to said rectifier, a direct current ouput circuit for said rectifier, means responsive to the current in said output circuit to selectively connect taps of increasing voltage on said transformer to said rectifier when the output current is increased, and means responsive to the voltage in said output circuit to interpose a continuously increasing resistance in the input circuit of the rectifier in accordance with the increase of the output voltage.

5. A constant voltage rectifier power supply system which comprises in combination a dry-disc rectifier having an alternating current input circuit and a direct current output circuit, a transformer with a plurality of taps of different voltage on its secondary winding in said input circuit, means including at least one limit relay responsive to the current in said output circuit to selectively connect taps of increasing value on said secondary winding to said rectifier when said current increases over a predetermined value, a continuously variable resistor in the input circuit of said rectifier, and means under the control of the voltage in the output circuit to increase the value of said resistor when said voltage is increased.

6. A constant voltage rectifier power supply system which comprises in combinaton a rectifier, an alternating current input circuit and a direct current output circuit for said rectifier, a transformer with a plurality of taps of different voltage on its secondary winding in said input circuit, a plurality of limit relays having their operating windings connected in said output circuit and adapted to be progressively actuated by the current therein to connect taps of increasing voltage to said rectifier when said current exceeds predetermined values, a continuously variable voltage regulator resistance interposed in the input circuit of said rectifier, and means under the control of the voltage in said output circuit to increase said resistance when said voltage is increased thereby to maintain the output voltage constant.

7. A constant voltage rectifier power supply system which comprises in combination a rectifier, an alternating current input circuit and a direct current output circuit for said rectifier, a power transformer having a secondary winding with a plurality of taps of different voltage in said input circuit, a filtering network in said output circuit, a plurality of limit relays having their operating coils serially connected in said output circuit and adapted to be progressively actuated by the current therein to selectively connect taps of increasing voltage to said rectifier when said current exceeds predetermined values, a continuously variable voltage regulator resistance of the compression type interposed in the input circuit of said rectifier, electro-magnetic means under the control of the filtered output voltage to increase said resistance when said voltage is increased, and means for adjusting the range of operation of said voltage regulator resistance.

8. A constant voltage rectifier power supply system which comprises in combination a rectifier normally having poor regulation, an input and an output circuit therefor, a source of alternating current in said input circuit adapted to supply a plurality of different input voltages of substantially fixed value to said rectifier, a voltage regulator resistance serially connected in said input circuit, electromagnetic switching means responsive to the output current to selectively connect one of said input voltages to said rectifier, and electromagnetic means responsive to the output voltage to continuously adjust said resistance whereby the output voltage of the system is maintained constant under variable load conditions.

ROBERT O. WHITESELL.

REFERENCES CITED

The following references are of record in the file of this patent:

UNITED STATES PATENTS

| Number | Name | Date |
| --- | --- | --- |
| 1,163,708 | Thomas | Dec. 14, 1915 |
| 1,614,147 | Muller | Jan. 11, 1927 |
| 1,753,921 | Edelman | Apr. 8, 1930 |
| 1,485,076 | Haighton | Feb. 26, 1924 |
| 1,662,889 | Hubbard | Mar. 20, 1928 |
| 1,808,717 | Stryker | June 2, 1931 |
| 1,722,152 | Meiners | July 23, 1929 |
| 1,963,186 | Wolfert | June 19, 1934 |